Oct. 2, 1956      E. P. WENZELBERGER      2,765,235

SUCTION SEPARATION OF ICE AND FLUID

Filed March 13, 1952      2 Sheets-Sheet 1

INVENTOR
ELWOOD P. WENZELBERGER
BY Toulmin & Toulmin
ATTORNEYS

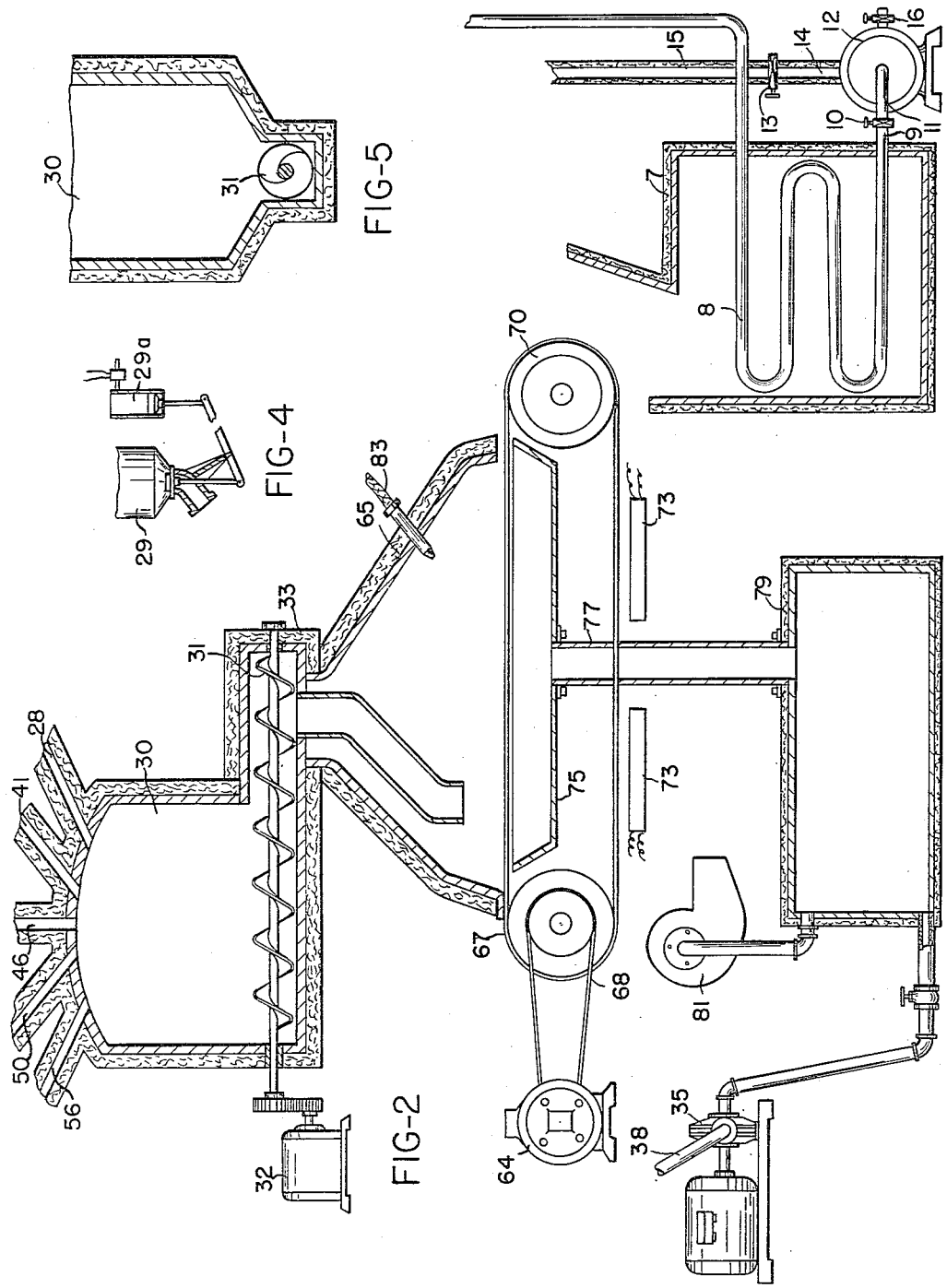

United States Patent Office 2,765,235
Patented Oct. 2, 1956

2,765,235

SUCTION SEPARATION OF ICE AND FLUID

Elwood P. Wenzelberger, Dayton, Ohio, assignor to The Commonwealth Engineering Company of Ohio, Dayton, Ohio, a corporation of Ohio Application March 13, 1952, Serial No. 276,346

17 Claims. (Cl. 99—199)

This invention relates to improvements in methods and apparatus for the dehydration of solutions and suspensions by solvent removal achieved through freezing of the solvent.

More particularly the invention relates to the method and apparatus for the separation of the frozen solvent from the desired fluid. For example, the invention relates particularly to the removal of water from fruit juices, beer, wines, pharmaceuticals such as antibiotics, heat sensitive resins, coffee, milk and vegetable juices.

In issued United States Patent No. 2,559,205 I have described methods and apparatus for the concentration of materials of the kind set forth above wherein separation of the frozen solvent (water) from the juice is effected by a centrifugal operation. While this method is satisfactory, the centrifuge is a relatively expensive piece of high speed equipment which it is desirable to replace by machinery of lesser initial cost without sacrificing the effectiveness of the centrifuge.

It is accordingly a primary object of this invention to provide apparatus for fluid juice concentration equipment capable of effective and economical separation of frozen ice crystals from a fluid juice.

It is a further object of this invention to provide apparatus for fluid juice concentration equipment capable of satisfactory operation for separation of the frozen ice crystals at low feet per minute speeds.

It is a particular object of this invention to provide an economical and effective method of separating ice crystals from a fluid juice.

These and other objectives are attained by providing in a system similar to that described in the patent referred to hereinbefore a novel separation means for the ice and fluid, which separation means comprises essentially a continuous screen belt operating over rollers, one of which is driven, the top strand of belt being subjected to a vacuum pressure applied through a suction chamber dimensioned similar to and substantially abutting the base of an insulated hood mounting over the said top strand.

The ice crystal-fluid juice mixes are fed to the continuous screen belt from a collecting chamber connected with heat exchanger tanks by means of an auger which provide for uniform flow of the mass while inhibiting the development of white ice which would act to entrain small portions of the juice.

The application of vacuum pressure to the screen belt carrying the ice-juice mass causes the juice to be drawn through the belt to a juice tank from which the juice is recycled for further concentration.

The invention will be more fully understood by reference to the following detailed description and the accompanying drawings wherein:

Figure 2 is an enlarged sectional view of the separating means of invention;

Figure 4 is a detailed view of a valve used in connection with the freeze tanks of the apparatus; and Figure 5 is an end elevational view of the collecting chamber.

Figure 3:
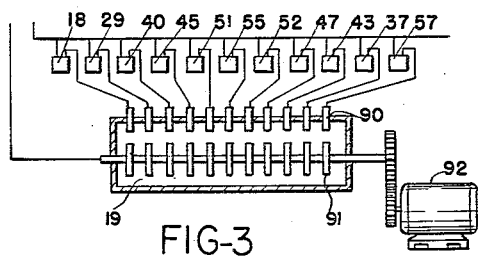
Figure 3 is a view of the automatic electric control system for the apparatus.
Figure 1:
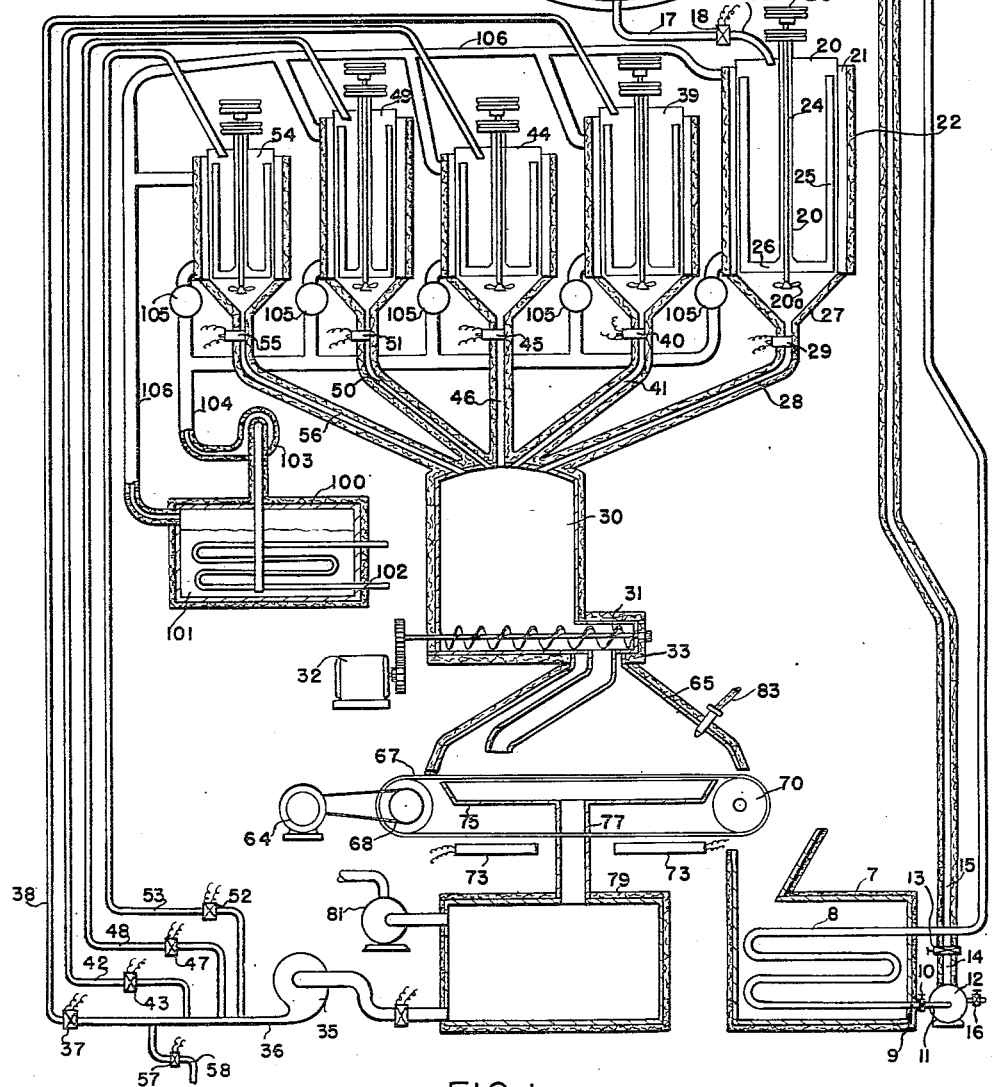
Figure 1 is a diagrammatic view of the complete mechanism for continuous and progressive dehydration.

Referring briefly to Figure 1, it will be noted that a supply tank 1 of raw juice cooled by a refrigerating liquid passed from line 3 through jacket 2 and out through line 4, is provided at the lower end thereof with an outlet 17 having an electrically operated valve 18. A tank 20 positioned below the outlet of line 17 is provided with a freezing chamber 21 insulated at 22 and connected with a conventional refrigerating system comprising a tank 100, a refrigerating liquid 101 therein, and a refrigerating coil 102 in the liquid 101. A pump 103 circulates the refrigerant through line 104 and thermostatic control valve 105 to chamber 21, the refrigerants being returned to tank 100 through line 106. The other tanks 39, 44, 49 and 54 are similarly refrigerated under control. Each of the tanks as at 20 is provided with a motor pulley 23, shaft 24 and vertical and horizontal stirrer blades 25, 26. Also a propeller 20a is provided having an 18 degree pitch and driven by a shaft passing through the center of the hollow shaft of wiper 20b. The propeller 20a rotates clockwise at 600 to 800 R. P. M. and the wiper rotates counter-clockwise at about 125 R. P. M.

The tank 20 discharges through a valve 29 which together with valves 40, 45, 51 and 55 are operably connected with a master sequence timer 19 which includes a plurality of cam acting switch means 90 each operated by one of a series of cams 91. The cams 91 are severally connected also with valves 18, 52, 47, 43, 37 and 57 and are actuated sequentially by operation of motor 92. The particular sequence of operation is fully set forth in my Patent No. 2,552,525 and accordingly need not be specifically set forth herein.

Each of the tanks 20, 39, 44, 49 and 54 opens into a collecting chamber 30 through an insulating line as at 28, and chamber 30 is provided with an auger 31 which is continuously driven by motor 32 to move the ice and fluid juice mixture received from the respective tanks through a port 33 in hood 65 of insulating material, whereafter the slush passes on to an endless screen belt 67 which closely surrounds the surface of the upper strand of belting. The chamber 30 as may be noted from Figure 5 is provided with sloping walls which assist the feed of the ice crystal-juice mixture to the auger.

The screen belt 67 is preferably of about 100 to 125 mesh, and if of metal is covered with a material of poor heat conductivity having openings corresponding to those of the screen belt. The belt may suitably be of a poor heat conductive material and if desired may be of an open weave cotton fabric of about 90 threads to the inch.

A motor 64 connected to drive pulley 68 moves the belt in the direction indicated by the arrow; adjacent driven pulley 70 a tank 7 provided with a cooling coil 8 is adapted to receive ice from the belt which ice serves to cool the refrigerant of the cooling coil 8; the refrigerant is then passed through line 9, valve 10, pipe 11, pump 12, line 14, valve 13 and line 15 into line 3 for cooling of the chamber 1. A drain valve is conveniently provided at 16.

The underside of the belt 67 is provided with heater units indicated at 73 which serve to remove moisture from the belt. The heat applied however should not be excessive and in many instances may be dispensed with particularly where the fruit juice treated contains a heat sensitive component.

Positioned closely adjacent the under surface of the upper belt strand is a vacuum chamber 75 which is dimensionally similar to and in substantial abutment with the base of the hood 65 and the walls of which, similar to hood 65, are of insulating material. The hood if desired may embrace the lower belt strand, but preferably a throat 77 extends outwardly of the belt structure and connects with juice receiving tank 79.

Tank 79 at the upper end thereof opens to a vacuum pump 81 which serves to apply suction pressure to the belt 67. Connected to the bottom of tank 79 is a pump 35 through which the concentrated juice of one stage is passed through a line as at 38 to the tank of the succeeding stage.

In operation the collection chamber 30 receives a quantity of juice and refrigerated ice from one of the tanks, as 20, and the tapered sides of this tank urge the slush on to the auger 31 which forces the material outwardly onto belt 67. The ice crystals of the slush are small and in great quantity and the concentrated juice is readily carried therein on the auger. In some instances it may be desirable to tilt chamber 30 slightly downwardly toward the belt so that the movement of the material will also be facilitated by gravity.

The slush in passing from the tank to the belt 67 is maintained at approximately a constant temperature and remains at the constant temperature throughout the travel thereof on the belt due to the provision of the insulating hood 65. It may be noted that should the temperature change sufficiently to permit a slight melting of the ice crystals that agglomeration of the ice might result, which would occasion entraining of the juice in the ice, thus decreasing the efficiency of the apparatus.

The suction applied to the moving belt 67 causes the fluid juice to separate from the slush and to be passed through the openings in the belt through throat 77 to tank 79. The crystals passing on the belt to the right, as shown in Figure 2, may tend to retain a very slight amount of the juice and accordingly the hood 65 is conveniently provided with a nozzle 83 from which a light spray of cool water passes to the crystals. The cool crystals then pass under the hood over the end of the belt and are deposited in the chamber 7.

The juice from the concentration step is passed from tank 79 through pump 35 to the succeeding stage of operation. Meanwhile the belt which has passed from under the hood 65 has excess moisture removed from the underside thereof by application of heat from heater 73.

The belt speed may be conveniently adjusted to handle any given load and under economical conditions of operation will be in continuous movement for the continuous supply of slush thereon.

As noted hereinbefore the particular sequence of passing juice to the tank and from the tank to the collecting chamber and belt is similar to that described in United States Patent No. 2,559,205 and accordingly is not further described herein.

It will be understood that this invention is susceptible to modification in order to adopt it to different usages and conditions and accordingly, it is desired to comprehend such modifications within this invention as may fall within the scope of the appended claims.

I claim:

1. In apparatus for the receiving and separation of a refrigerated mass of liquid and small solvent crystals, the structure comprising a refrigerant means for holding and refrigerating said mass, a chamber to continuously receive said crystals and liquid from said mass of refrigerant means, means comprising an auger for moving said mass of crystals and liquid uniformly from said chamber, an apertured conveyor belt arranged below said auger for continuously receiving said crystals and liquid on a moving strand thereof, said belt means having apertures therethrough of a size smaller than that of said crystals, means to maintain the temperature of the crystals substantially constant, and means to apply suction to said strand to cause the concentrated liquid to separate from said crystals and flow through said apertures.

2. In apparatus for the receiving and separation of a refrigerated mass of liquid and small solvent crystals, the structure comprising a refrigerant means for holding and refrigerating said mass, a chamber to continuously receive said mass of crystals and liquid from said refrigerant means, an auger in the base of said chamber to move said mass of crystals and liquid uniformly from said chamber, an apertured conveyor belt for continuously receiving said mass of crystals and liquid on a moving strand thereof, said belt means having apertures therethrough of a size smaller than that of said crystals, heat insulating means to maintain the temperature of the crystals substantially constant, and means to apply suction to the lower side of said strand to cause the concentrated liquid thereon to separate from said crystals and flow through said apertures.

3. In apparatus for the receiving and separation of a refrigerated mass of liquid and small solvent crystals, the structure comprising a refrigerant means for holding and refrigerating said mass, a chamber having wall sloping toward the base thereof to continuously receive said mass of crystals and liquid from said refrigerant means, an auger in the base of said chamber between said sloping walls to move said mass of crystals and liquid uniformly from said chamber, apertured conveyor belt means disposed below said chamber for receiving said mass of crystals and liquid on a moving strand thereof, said belt having apertures therethrough of a size smaller than that of said crystals, means to maintain the temperature of the crystals substantially constant, and means to apply suction to the lower side of said strand to cause the concentrated liquid thereon to separate from said crystals and flow through said apertures.

4. In apparatus for the receiving and separation of a refrigerated mass of liquid and small solvent crystals, the structure comprising a refrigerant means for holding and refrigerating said mass, a chamber for receiving said mass of crystals and liquid from said refrigerant means, means for conveying said mass of crystals and liquid uniformly from said chamber, apertured conveyor belt means to continuously receive said mass of crystals and liquid on a moving strand thereof, said belt means having apertures therethrough of a size smaller than that of said crystals, a heat insulating hood extending from said chamber over said strand, a vacuum chamber dimensionally similar to and in substantial abutment with the base of said hood and positioned below said strand, and means to apply suction to said vacuum chamber and said strand to cause the concentrated liquid to separate from said crystals and flow through said apertures.

5. In apparatus for the receiving and separation of a refrigerated mass of liquid and small solvent crystals, the structure comprising a refrigerant means for holding and refrigerating said mass, a chamber for receiving said mass of crystals and liquid from said refrigerant means, means for conveying said mass of crystals and liquid uniformly from said chamber, apertured conveyor belt means to continuously receive said mass of crystals and liquid on a moving strand thereof, said conveyor belt means consisting of a metallic screen belt of about 100 to about 125 mesh covered with a material of low heat conductivity having openings corresponding to those of the screen belt, means to maintain the temperature of the crystals substantially constant, and means to apply suction to said strand to cause the concentrated liquid to separate from said crystals and flow through said apertures.

6. In apparatus for the receiving and separation of a refrigerated mass of liquid and small solvent crystals, the structure comprising a refrigerant means for holding and refrigerating said mass, a chamber for receiving said mass of crystals and liquid from said refrigerant means, means to uniformly pass said crystals and said liquid through an opening in the bottom of said chamber, apertured conveyor belt means arranged below said chamber and having an upper strand thereof continuously passing beneath said opening to receive said mass of crystals and liquid thereon, said belt means having apertures through which said liquid may move under the influence of suction applied to said strand while said crystals are retained on said belt strand and travel therewith, a heat insulating hood extending from said chamber over said strand, spray means in said hood adjacent the end of said strand travel for directing a cool stream of fluid on said crystals to remove any liquid remaining thereon.

7. In apparatus for the receiving and separation of a refrigerated mass of liquid and small solvent crystals, the structure comprising a refrigerant means for holding and refrigerating said mass, a chamber for receiving said mass of crystals and liquid from said refrigerant means, means to uniformly pass said crystals and said liquid through an opening in the bottom of said chamber, apertured conveyor belt means below said chamber and having a moving strand thereof continuously passing beneath said opening to receive said mass of crystals and liquid thereon, said belt means having apertures through which said liquid may move under the influence of suction applied to said strand while said crystals are retained on said belt strand and travel therewith, means to maintain the temperature of the crystals substantially constant while on a said strand, means to receive said crystals from said upper strand at the end of the travel thereof, and heating means adjacent the lower strand to remove excess moisture therefrom in the passage of said lower strand.

8. In apparatus for the receiving and separation of a refrigerated mass of liquid and small solvent crystals, the structure comprising an apertured conveyor belt means for receiving and conveying said mass of crystals and liquid on a strand thereof, said belt means having apertures therethrough of a size smaller than that of said crystals, means to maintain the temperature of the crystals substantially constant, means to apply suction to said strand to cause the concentrated liquid to separate from said crystals and flow through said apertures, and means comprising a pump to recycle said concentrated liquid to said refrigerating means for further concentration of said liquid.

9. In a method of separating liquid from a refrigerated liquid solvent crystal mass, the steps of uniformly distributing the mass, supporting the distributed mass on an endless support having openings for passing only the liquid therethrough, and applying suction at said openings to draw said liquid therethrough while maintaining the temperature of said mass substantially constant.

10. In a method of separating liquid from a refrigerated liquid solvent crystal mass the steps of uniformly distributing the mass, moving the distributed mass along while supported above openings traveling with the mass, and applying suction at said openings to draw said liquid therethrough while maintaining the temperature of said mass substantially constant.

11. In a method of separating liquid from a refrigerated liquid solvent crystal mass the steps of uniformly distributing the mass, moving the distributed mass along while supported above openings traveling with the mass, applying suction at said openings to draw said liquid therethrough while maintaining the temperature of said mass substantially constant and spraying the said crystals with a cooling fluid to remove all liquid therefrom.

12. In a method of freeze dehydrating milk, the steps of separating water therefrom as ice crystals which comprises subjecting the milk to freezing temperature sufficient to cause water to crystallize out as ice crystals, separating the crystals thus formed therefrom by moving the slushy mass over a foraminous support, subjecting the same while thus supported and moving to reduced pressure conditions to draw off the liquid from the mass of ice crystals, and collecting the same.

13. In a method of freeze dehydrating milk, the steps of separating water therefrom as ice crystals which comprises subjecting the milk to freezing temperature sufficient to cause water to crystallize out as ice crystals, separating the crystals thus formed therefrom by moving the slushy mass over a heated foraminous support, subjecting the same while thus supported and moving to reduced pressure conditions to draw off the liquid from the mass of ice crystals, applying vacuum to separate the liquid, rinsing the ice crystals with water to remove milk particles occluded thereon, and recovering the concentrated milk as a mixture including the rinsings and freed ice crystals.

14. In a method of freeze dehydrating citrus juices, the steps of separating water therefrom as ice crystals which comprises subjecting the citrus juices to freezing temperature sufficient to cause water to crystallize out as ice crystals, separating the crystals thus formed therefrom by depositing the slushy mass onto a moving endless foraminous support, subjecting the same while thus supported and moving to reduced pressure conditions to draw off the liquid from the mass of ice crystals, and collecting the same.

15. In a method of freeze dehydrating citrus juices, the steps of separating water therefrom as ice crystals which comprises subjecting the citrus juices to a freezing temperature sufficient to cause water to crystallize out as fine ice crystals substantially free of solid or juice inclusions, separating the resultant ice crystals thus formed therefrom by moving the slushy mass over a heated foraminous support, applying suction thereto while moving the heated slushy mass along over the foraminous support, and collecting the liquid concentrated juice delivered passing through said support.

16. In a method of freeze dehydrating milk, the steps of removing water from said milk as ice crystals by subjecting the milk to freezing temperatures to cause the water to crystallize out as ice crystals forming a slushy mass, depositing said slushy mass on a moving foraminous support, separating said ice crystals from the slushy mass while said mass is supported and moved rectilinearly, and recovering a milk concentrate substantially free of water.

17. In a method of freeze dehydrating milk, the steps of removing water from said milk as ice crystals by subjecting the milk to freezing temperatures to cause the water to crystallize out as ice crystals forming a slushy mass, depositing said slushy mass on a moving foraminous support, subjecting said mass to reduced pressure conditions and mechanically separating said ice crystals therefrom while said slushy mass is supported and moved rectilinearly to recover a milk concentrate substantially free of water.

References Cited in the file of this patent

UNITED STATES PATENTS

| | | |
|---|---|---|
| Re. 23,810 | Schmidt | Mar. 30, 1954 |
| 658,726 | Naef | Sept. 25, 1900 |
| 935,359 | Diver | Sept. 28, 1909 |
| 1,636,890 | Zorn | July 26, 1927 |
| 1,791,398 | Bleil | Feb. 3, 1931 |
| 2,034,784 | Wallny | Mar. 24, 1936 |
| 2,121,208 | Milligan | June 21, 1938 |
| 2,173,256 | Jordan | Sept. 19, 1939 |
| 2,187,572 | Meinzer | Jan. 16, 1940 |
| 2,559,205 | Wenzelberger | July 3, 1951 |
| 2,685,783 | Benscheidt | Aug. 10, 1954 |
| 2,734,355 | Wenzelberger | Feb. 14, 1956 |